United States Patent
Mayer et al.

(10) Patent No.: US 9,134,458 B2
(45) Date of Patent: Sep. 15, 2015

(54) PREDICTION OF SOLAR OBSCURATION EVENTS BASED ON DETECTION OF SPECTRAL DISTRIBUTION SHIFTS CAUSED BY APPROACHING CLOUDS

(71) Applicant: General Electric Company, Schenectady, NY (US)

(72) Inventors: Oliver Gerhard Mayer, Garching (DE); Christian M Heller, Garching (DE); Marcus Zettl, Garching (DE); Omar Stern, Garching (DE); Mark Ronald Lynass, Munich (DE); Eva Bernal Serra, Munich (DE); Marianne Hartung, Garching (DE); Michael Schmidt, Garching (DE); Eike Mueggenburg, Garching (DE); Yvonne Boose, Zurich (CH)

(73) Assignee: General Electric Company, Niskayuna, NY (US)

( * ) Notice: Subject to any disclaimer, the term of this patent is extended or adjusted under 35 U.S.C. 154(b) by 203 days.

(21) Appl. No.: 13/926,115

(22) Filed: Jun. 25, 2013

(65) Prior Publication Data

US 2014/0373893 A1    Dec. 25, 2014

(51) Int. Cl.

| | |
|---|---|
| *G01W 1/10* | (2006.01) |
| *G01W 1/12* | (2006.01) |
| *G01R 31/40* | (2014.01) |
| *F24J 2/00* | (2014.01) |
| *F24J 2/38* | (2014.01) |

(52) U.S. Cl.
CPC . *G01W 1/10* (2013.01); *G01W 1/12* (2013.01); *H02S 50/00* (2013.01); *F24J 2/00* (2013.01); *F24J 2/38* (2013.01)

(58) Field of Classification Search
CPC combination set(s) only.
See application file for complete search history.

(56) References Cited

U.S. PATENT DOCUMENTS

| | | | |
|---|---|---|---|
| 2007/0084502 A1 | 4/2007 | Kelly et al. | |
| 2007/0246095 A1* | 10/2007 | Schaefer | 136/246 |
| 2009/0132167 A1* | 5/2009 | Artis | 702/3 |
| 2010/0000517 A1 | 1/2010 | Zalusky | |
| 2010/0198420 A1* | 8/2010 | Rettger et al. | 700/291 |
| 2010/0309330 A1* | 12/2010 | Beck | 348/222.1 |
| 2011/0060475 A1 | 3/2011 | Baldwin et al. | |
| 2011/0220091 A1 | 9/2011 | Kroyzer | |
| 2012/0062037 A1 | 3/2012 | Mendez Hernandez et al. | |
| 2013/0074824 A1 | 3/2013 | Shin et al. | |

OTHER PUBLICATIONS

Rudolf, "Tracking Clouds to Predict Solar Bounty", Green, Sep. 28, 2010.
Abstract of paper by ROB et al., "The Effect of Spectral Albedo on Amorphous Silicon and Crystalline Silicon Solar Photovoltaic Device Performance", Solar Energy, vol. 91, pp. 233-241, May 2013.

* cited by examiner

*Primary Examiner* — Francis M Legasse, Jr.
(74) *Attorney, Agent, or Firm* — Paul J. DiConza

(57) ABSTRACT

A physical effect (optical effect), which may be observed in solar irradiance as shading due to a cloud passing overhead may be approaching a given location (e.g., a location at or proximate a solar power generator), has been discovered. This optical effect takes place prior to an occurrence of a solar obscuration event by the cloud, and thus this optical effect may be effectively sensed and processed in apparatuses, systems and methods to predict the occurrence of a solar obscuration of the power generator.

20 Claims, 5 Drawing Sheets

PREDICTION OF SOLAR OBSCURATION EVENTS BASED ON DETECTION OF SPECTRAL DISTRIBUTION SHIFTS CAUSED BY APPROACHING CLOUDS

FIELD OF THE INVENTION

The present invention is generally related to power generation, which may involve a power generation system for generating electrical power, and which varies in response to variations of solar irradiance, and, more particularly, to apparatus, system and method for predicting solar obscuration events, as may affect such a power generation system.

BACKGROUND OF THE INVENTION

Large-scale generation of electric power based on a freely-available, essentially inexhaustible natural resource, such as solar irradiance, continues progressing as an attractive modality for clean and efficient generation of electric power.

The weather-induced variability of the natural resource (e.g., due to cloud cover variability in the case of solar irradiance) may cause challenges at various levels, such as at a component level, at a subsystem level, at a distribution level as well as on the larger power grid. Cloud tracking devices may generally either lack the ability to accurately and consistently predict solar obscuration events and/or may involve relatively costly and complex implementations.

Accordingly, there is a need for an improved apparatus and/or techniques, which at a relatively low cost may accurately and reliably predict solar obscuration events that may affect a power generation system.

BRIEF DESCRIPTION OF THE DRAWINGS

The invention is explained in the following description in view of the drawings that show.

DETAILED DESCRIPTION OF THE INVENTION

The inventors of the present invention have innovatively discovered a physical effect (i.e., optical effect) that may be observed in solar irradiance as shading due to a cloud passing overhead may be approaching a given location (e.g., a location at or proximate a solar power generator). That is, this optical effect takes place prior to an occurrence of a solar obscuration event by the cloud, and thus may be effectively used to predict the occurrence of a solar obscuration of the power generator. The discovery of this optical effect had led the inventors to cleverly develop apparatus and techniques based on detection of such optical effect, as may be applied to prediction of solar obscuration events that may affect a power generation system.

Figure 1:
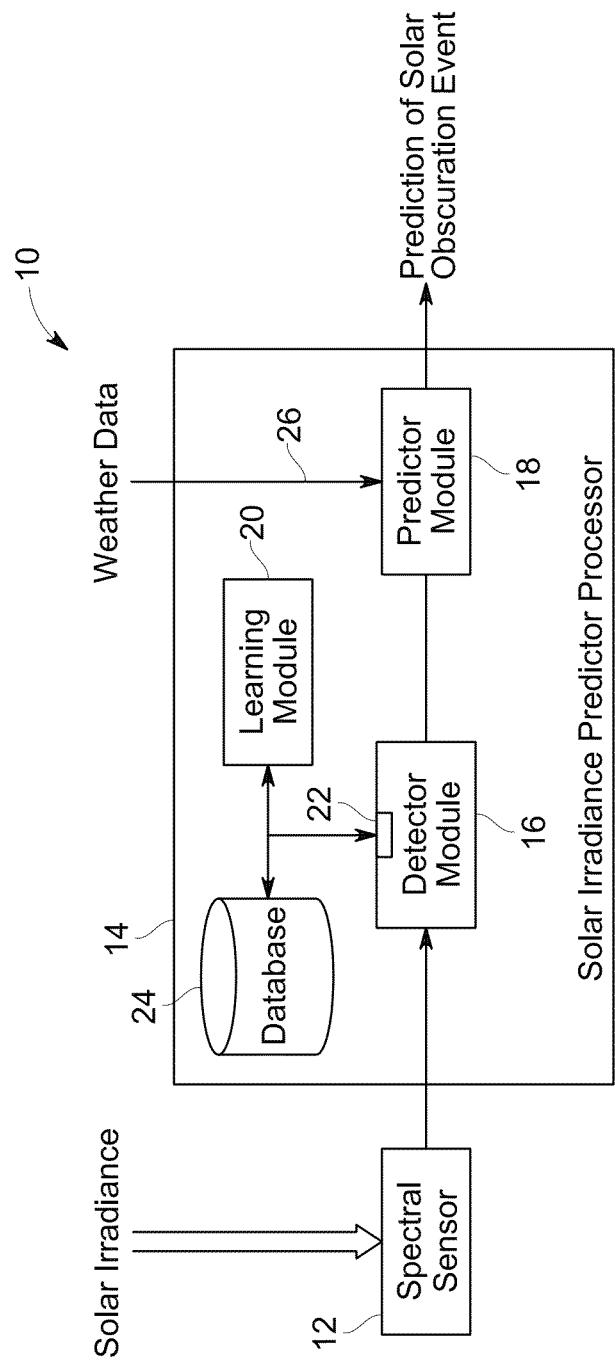
FIG. 1 is a block diagram representation of a non-limiting embodiment of an apparatus embodying aspects of the present invention, as may be used for predicting solar obscuration events that may affect a power generation system.

FIG. 1 is a block diagram representation including one non-limiting embodiment of an apparatus 10 embodying aspects of the present invention, as may be used for predicting solar obscuration events due to cloud cover. A spectral sensor 12 may be configred to sense solar irradiance over a predefined spectral range (e.g., comprising a visible light spectrum). A solar irradiance predictor processor 14 may be coupled to receive at least one signal indicative of the sensed solar irradiance. Processor 14 may include a detector module 16 configured to detect a shift in a spectral distribution of the sensed solar irradiance in response to an approaching cloud. A predictor module 18 may be configured to predict over a time horizon an occurrence of a solar obscuration event in response to detection of the approaching cloud.

Figure 2:
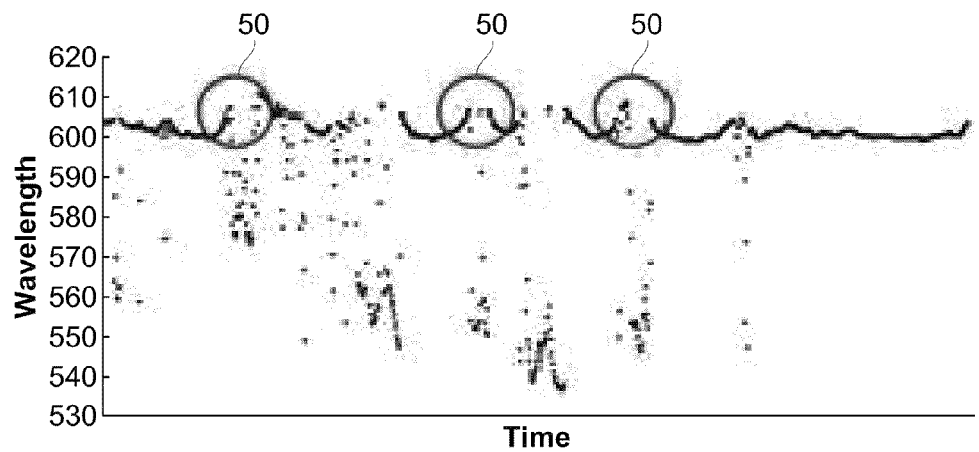
FIG. 2 is a plot of an example sequence of spectral distribution shifts in a spectrum of solar irradiance caused by approaching clouds.

FIG. 2 is a plot of an example sequence of spectral distribution shifts in a spectrum of solar irradiance, as may be appreciated within the respective circles 50 shown in FIG. 2. More particularly, such spectral distribution shifts exhibit a shift (e.g., upward shift) towards a red portion of the visible light spectrum in response to an approaching cloud. This optical effect may be innovatively applied to prediction of solar obscuration events.

Figure 3:
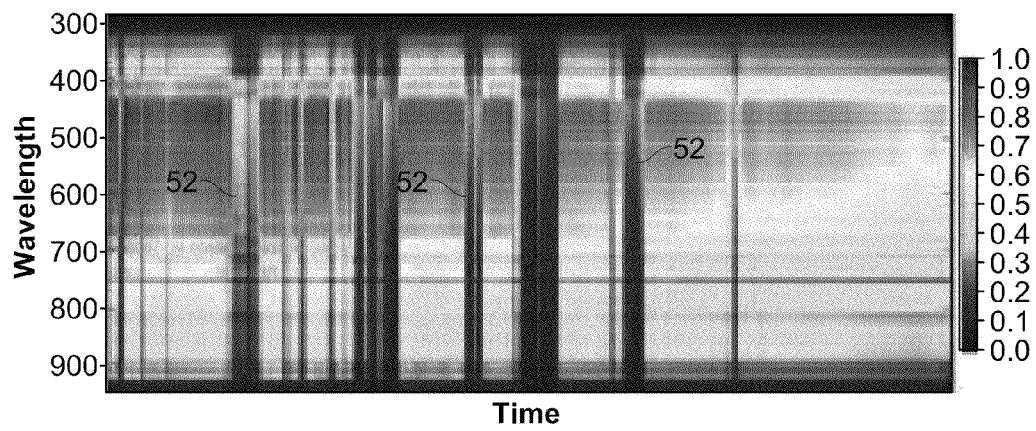
FIG. 3 is a plot of an example spectrum of solar irradiance contemporaneous with the spectral distribution shifts shown in FIG. 2.

FIG. 3 is a plot of an example spectrum of solar irradiance contemporaneous with the spectral distribution shifts shown in FIG. 2, and where solar obscuration events 52 may be observed. It can be appreciated that the spectral distribution shifts plotted in FIG. 2 occur earlier in time relative to an outset of an obscuration event. Accordingly, detection of such spectral distribution shifts may be used for prediction of solar obscuration events. It is noted that the spectral distribution shifts 50 are observed prior to the gradual transition of the spectral distribution to the blue portion of the visible light spectrum, once solar obscuration has taken place. That is, during the solar obscuration longer wavelengths (redder spectral component) tend to be absorbed more by the water vapor content in the cloud.

In one non-limiting embodiment, the time horizon may range from approximately several seconds (e.g., in the order of approximately five seconds) to approximately several minutes (e.g., in the order of approximately five minutes or more). It will be appreciated that aspects of the present invention are not limited to any specific time horizon since in a practical application the prediction time horizon may involve various tradeoff considerations, such as for example the time horizon should be sufficiently long so that an appropriate control strategy may be timely implemented. Conversely, the time horizon should be sufficiently short so that the degree of uncertainty associated with a prediction event is kept within reasonable bounds.

Returning to FIG. 1, in one non-limiting embodiment, solar irradiance predictor processor 14 may include a learning module 20, which may be configured to train an algorithm, which may be stored in a memory 22 coupled to the detector module. In one non-limiting embodiment, the algorithm may be used to learn a functional differentiation effective to enhance detection of shifts in the spectral distribution of the solar irradiance, which may be used for prediction of solar obscuration events. For example, under a cloudless sky, solar irradiance variation may typically follow a sinusoidal function, and thus it is envisioned that learning module 20 may be configured to learn a functional differentiation, (e.g., learn to differentiate from the typical sinusoidal variation under a cloudless sky) which may be conducive to enhance accurate identification of shifts due to optical effects in the spectral distribution of the solar irradiance, which are in fact predictive of solar obscuration events.

In another non-limiting embodiment, solar irradiance predictor processor 14 may further include a database 24 comprising historical data to establish a baseline spectral distribution for solar irradiance, such as under a cloudless sky. The baseline spectral distribution for solar irradiance may be established based on various factors that may affect solar irradiance, such as geographical location, time of day, atmospheric conditions, etc. For example, the baseline spectral distribution may be appropriately tailored to take into account such factors so as to improve detection of shifts in the spectral distribution of the solar irradiance that are indicative of an approaching cloud.

In one non-limiting example, predictor module 18 may be optionally coupled to take into account knowledge of weather conditions, as may be gained from weather data 26, which for example may be acquired from meteorological services, etc. For example, the predicted time for the solar obscuration event and/or the shape of the spectral shift indicative of an approaching cloud may be adjusted depending on wind conditions that may affect the travel velocity and/or direction of passing clouds.

Figure 4:
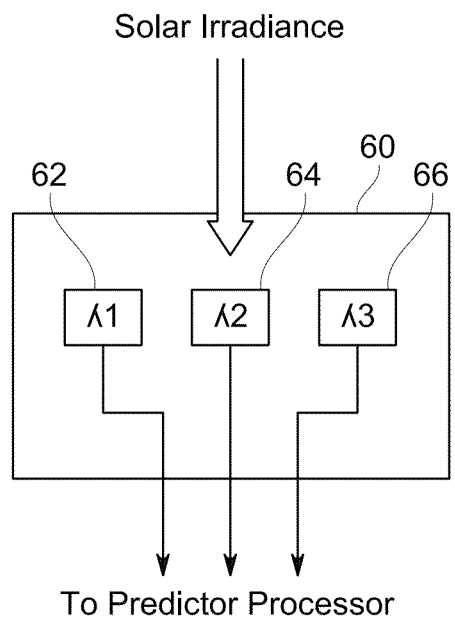
FIG. 4 is a block diagram of a non-limiting embodiment of a spectral sensor that may be used to sense solar irradiance in accordance with aspects of the present invention.

FIG. 4 is a block diagram of a non-limiting embodiment of a spectral sensor 60 that may be used to sense solar irradiance in accordance with aspects of the present invention. In this embodiment, spectral sensor may comprise at least two sensors, such as sensors 62, 64 and 66 (e.g., labeled $\lambda 1$, $\lambda 2$ and $\lambda 3$) having different spectral sensitivities in response to the solar irradiance. For example, sensors 62, 64 and 66 may be made from materials, such as amorphous Silicon (a-Si), Cadmium Telluride (CdTe), Germanium (Ge), etc., having different spectral sensitivities in response to received solar irradiance. The output signals from sensors 62, 64 and 66 would be coupled to solar irradiance predictor processor 14 for appropriate signal conditioning and processing. For example, such signals may be numerically related to one another—e.g., using standard numerical analysis techniques, which would be readily understood by those skilled in the art—to detect the shift in the spectral distribution of the solar irradiance. In one non-limiting embodiment, a ratiometric technique may be used to determine variation in the spectral content of the solar irradiance sensed by the various sensors.

Figure 5:
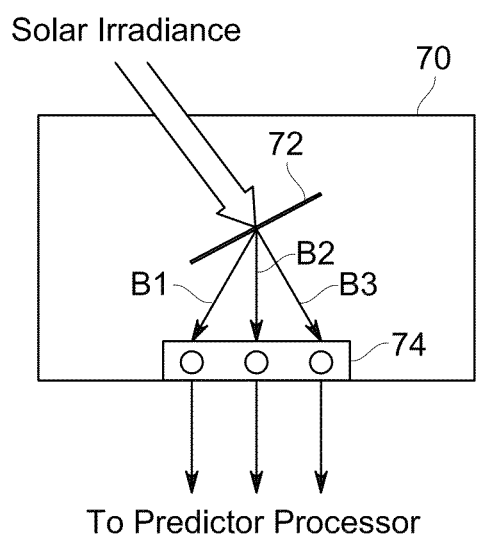
FIG. 5 is a block diagram of another non-limiting embodiment of a spectral sensor that may be used to sense solar irradiance in accordance with aspects of the present invention.
Figure 7:
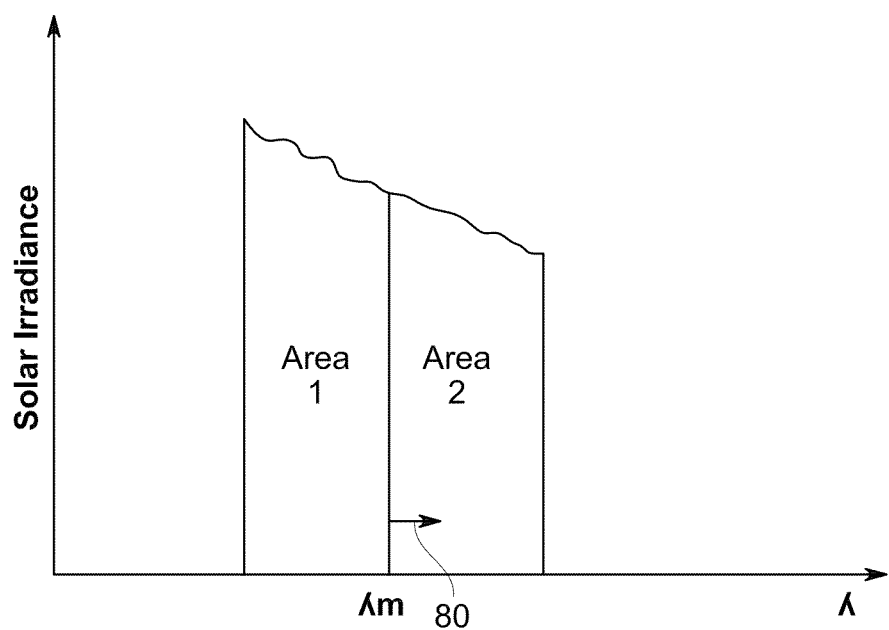
FIG. 7 is a graph plotting a conceptual curve of solar irradiance as a function of wavelength, which may be used for illustrating concepts in connection with a ratiometric technique that may be used in one non-limiting embodiment to determine variation in the spectral content of the solar irradiance.

The description below illustrates one straightforward non-limiting conceptualization of such a technique for determining variation in the spectral content of the solar irradiance sensed by the sensors. For simplicity of explanation, presume two sensors having different spectral sensitivities are used to sense solar irradiance. FIG. 7 is a graph plotting a conceptual curve of solar irradiance as a function of wavelength. Presume that under cloudless conditions, area 1 represents the spectral intensity sensed by one of the two sensors, and area 2 represents the spectral intensity sensed by the second sensor and further presume wavelength Am represents a middle wavelength where area 1 and area 2 have approximately the same size (e.g., a baseline comprising approximately a common spectral intensity for the two sensors). It should be appreciated that a spectral distribution shift towards a red portion of the visible light spectrum (such as would occur in response to an approaching cloud) would cause area 2 to increase in size (increased intensity being sensed by the second sensor) relative to the size of area 1 and consequently wavelength Am would shift by a certain amount in a direction indicated by arrow 80 for the two areas to remain approximately the same size (e.g., wavelength Am would shift to restore the baseline intensity ratio for the solar irradiance measurements obtained from the two sensors). FIG. 5 is a block diagram of another non-limiting embodiment of a spectral sensor 70 that may be used to sense solar irradiance in accordance with aspects of the present invention. In this embodiment, spectral sensor may comprise a light splitter 72 (e.g., a diffraction grating, etc.) optically coupled to a photosensor array 74. For example, if the spectral content of sensed solar irradiance shifts toward the red portion of the visible light spectrum, then more angular diffraction would be experienced by light passing through diffraction grating 72, and thus the power content of optical beam labeled B1 would increase relative to the power content of optical beams labeled B2 and B3. The output signals from photosensor array 74 would be coupled to solar irradiance predictor processor 14 for appropriate signal conditioning and processing. Once again, such signals would be numerically related to one another—e.g., using such standard numerical analysis techniques—to detect the shift in the spectral distribution of the solar irradiance.

Figure 6:
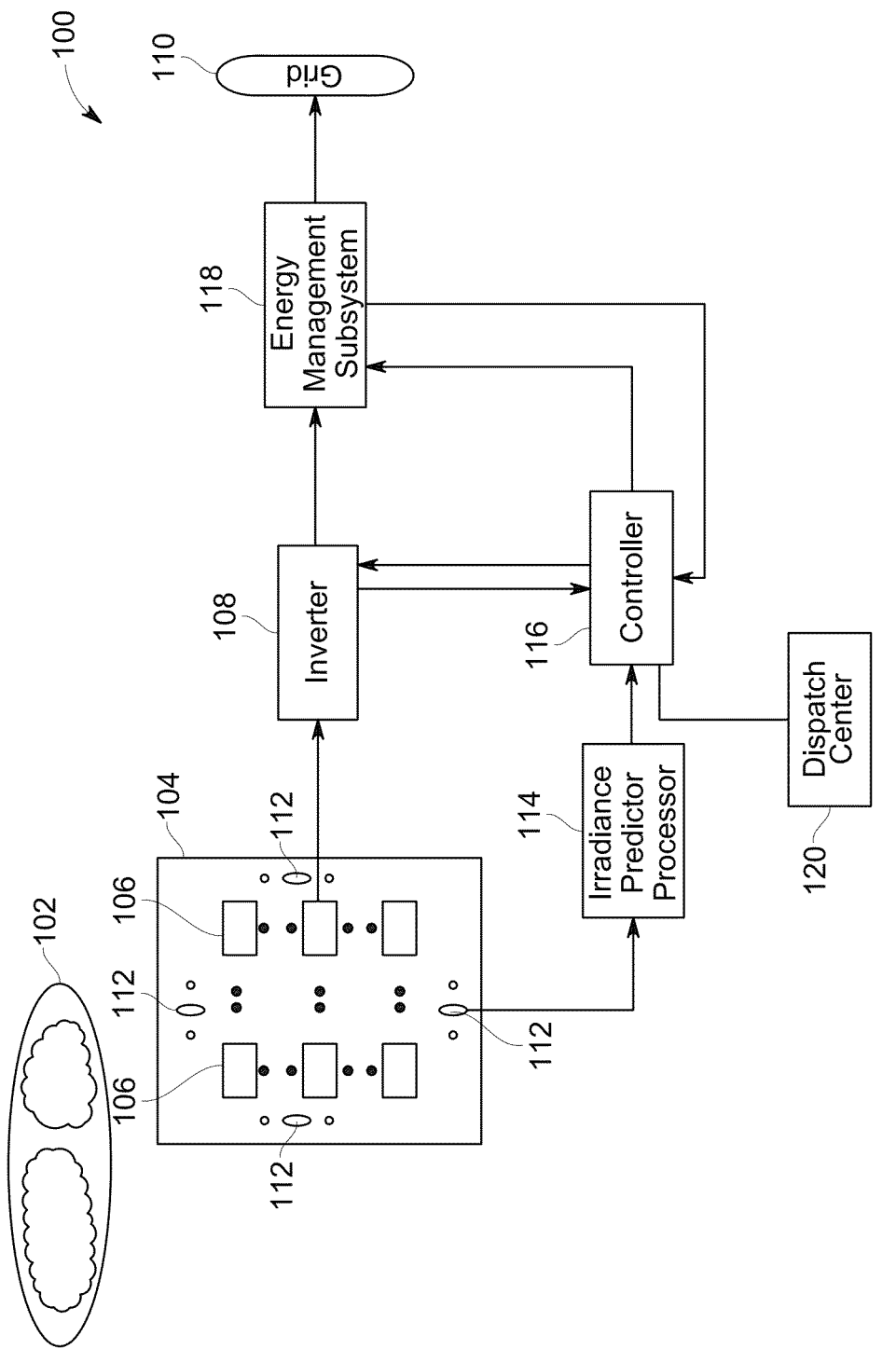
FIG. 6 is a schematic representation of a non-limiting embodiment of a power generation system responsive to solar irradiance for generating electrical power, as may include one or more apparatuses embodying aspects of the present invention.

FIG. 6 is a schematic representation of an example embodiment of a power generation system 100 responsive to solar irradiance for generating electrical power, which may vary in response to varying cloud coverage 102, which directly affects solar irradiance. The description below should be construed as a non-limiting application of an apparatus embodying aspects of the present invention, as described above in the context of FIGS. 1-5. Accordingly, the description below should not be construed in a limiting sense since many other applications may be realizable with an apparatus embodying aspects of the present invention.

FIG. 6 illustrates an array 104 of solar collectors 106, which may be subject to varying cloud coverage 102. It is contemplated that solar collectors may comprise solar power generators, which may directly or indirectly generate electrical power (e.g., solar energy to thermal energy to electrical energy). In one non-limiting application, solar power collectors 106 may comprise an array of photovoltaic (PV) modules, and varying cloud conditions can lead to changes in the power generating conditions of the array of PV modules. The array of power collectors 106 may be disposed over respective locations (e.g., spaced-apart locations) on a field, such as a utility-scale solar farm, as may involve a relatively large surface area (e.g., potentially hundreds of acres).

In one non-limiting embodiment, one or more inverters 108 may be coupled to the array of PV modules. For example, as will be appreciated by those skilled in the art, photovoltaic arrays naturally produce direct current (DC) power output when exposed to solar irradiance. Thus, in this example, one or more inverters may be used for converting the DC output from the photovoltaic array to an AC signal appropriate for coupling to a power grid 110.

One or more spectral sensors 112 may be coupled to one or more irradiance predictor processors, such as irradiance predictor processor 114, which as described above may be configured in accordance with aspects of the present invention to predict over a time horizon a likely occurrence of a solar obscuration event, which can affect a power-generating condition (e.g., may lead to a ramp down condition) for the array of power collectors 106.

A controller 116 may be responsive to the one or more event predictor processors 114 to perform an action in anticipation of a power-generating condition that will result in the array from the predicted obscuration event. For example, the action performed by controller 116 may be configured to adjust a control strategy for at least one component (e.g., inverter 108) and/or subsystem (e.g., an energy management subsystem 118) of the power generation system based on the predicted occurrence of the obscuration event. Controller 116 may be further configured to communicate to a dispatch center 120 an anticipated ramp-down condition.

It will be appreciated that aspects of an example inventive apparatus, as may be used for predicting solar obscuration events and method disclosed herein may be implemented by any appropriate processor system using any appropriate programming language or programming technique. The system can take the form of a hardware embodiment, a software embodiment or an embodiment comprising both hardware and software elements. In one embodiment, the system may be implemented by way of software and hardware (e.g., processor, imaging sensors), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Present examples of optical disks may include compact disk—read only memory (CD-ROM), compact disk—read/write (CD-R/R/W) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the presently available types of network adapters.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. Apparatus comprising:
   a spectral sensor configured to sense solar irradiance over a predefined spectral range comprising a visible light spectrum; and
   a solar irradiance predictor processor coupled to receive at least one signal indicative of the sensed solar irradiance, the processor comprising:
      a detector module configured to detect a shift in a spectral distribution of the sensed solar irradiance towards a red portion of the visible light spectrum in response to an approaching cloud; and
      a predictor module configured to predict over a time horizon an occurrence of a solar obscuration event in response to detection of the approaching cloud.

2. The apparatus of claim 1, wherein the solar irradiance predictor processor further comprises a learning module configured to train an algorithm to determine a functional differentiation indicative of the shift in the spectral distribution of the solar irradiance.

3. The apparatus of claim 1, wherein the solar irradiance predictor processor further comprises a database comprising historical data to establish a baseline spectral distribution for solar irradiance under a cloudless sky.

4. An array of solar collectors comprising at least one apparatus as recited in claim 1.

5. The apparatus of claim 1, wherein the spectral sensor comprises at least two sensors having different spectral sensitivities in response to the solar irradiance.

6. The apparatus of claim 1, wherein the spectral sensor comprises a light splitter optically coupled to a photosensor array.

7. The apparatus of claim 3, wherein the baseline spectral distribution is established based on at least one of the following: geographical location, time of day, atmospheric conditions.

8. Apparatus comprising:
   a solar irradiance predictor processor coupled to receive at least one signal indicative of sensed solar irradiance over a predefined spectral range, the processor comprising:
      a detector module configured to detect a shift in a spectral distribution of the sensed solar irradiance in response to an approaching cloud, wherein the predefined spectral range comprises a visible light spectrum and the shift comprises a shift towards a red portion of the visible light spectrum; and
      a predictor module configured to predict over a time horizon an occurrence of a solar obscuration event in response to detection of the approaching cloud.

9. The apparatus of claim 8, wherein the solar irradiance predictor processor further comprises a learning module configured to train an algorithm to determine a functional differentiation indicative of the shift in the spectral distribution of the solar irradiance.

10. The apparatus of claim 8, wherein the solar irradiance predictor processor further comprises a database comprising historical data to establish a baseline spectral distribution for solar irradiance under a cloudless sky.

11. The apparatus of claim 8, further comprising a spectral sensor coupled to supply the at least one signal indicative of sensed solar irradiance to the solar irradiance predictor processor.

12. An array of solar collectors comprising at least one apparatus as recited in claim 8.

13. The apparatus of claim 10, wherein the baseline spectral distribution is established based on at least one of the following: geographical location, time of day, atmospheric conditions.

14. A power generation system comprising:
   an array of solar collectors;
   at least one apparatus comprising:

a spectral sensor configured to sense solar irradiance over a predefined spectral range comprising a visible light spectrum; and a solar irradiance predictor processor coupled to receive at least one signal indicative of the sensed solar irradiance, the processor comprising:

a detector module configured to detect a shift in a spectral distribution of the sensed solar irradiance towards a red portion of the visible light spectrum in response to an approaching cloud; and a predictor module configured to predict over a time horizon an occurrence of a solar obscuration event in response to detection of the approaching cloud; and a controller responsive to the predictor module to perform an action in anticipation of a power-generating condition that would result in the array from the predicted obscuration event.

15. The power generation system of claim 14, wherein the predicted power-generating condition comprises a ramp-down condition, and the action performed by the controller is configured to adjust a control strategy for at least one component and/or subsystem of the power generation system in anticipation of the power-generating condition.

16. The power generation system of claim 14, wherein the predicted power-generating condition comprises a ramp-down condition, and the action performed by the controller is configured to communicate to a dispatch center the anticipated ramp-down condition.

17. A method comprising:

detecting a shift in a spectral distribution of a sensed solar irradiance in response to an approaching cloud, wherein the sensed solar irradiance comprises a visible light spectrum and the detecting comprises detecting a shift towards a red portion of the visible light spectrum; and processing the detected shift to predict over a time horizon an occurrence of a solar obscuration event.

18. The method of claim of 17, used in a power generation system comprising an array of solar collectors and further comprising:

performing an action in anticipation of a power-generating condition that will result in the array from the predicted obscuration event.

19. The method of claim 18, wherein the predicted power-generating condition comprises a ramp-down condition, and the method further comprises adjusting a control strategy for at least one component and/or subsystem of the power generation system based on the anticipated power-generating condition.

20. The method of claim 18, wherein the predicted power-generating condition comprises a predicted ramp-down condition and the method further comprises further comprises communicating to a dispatch center the anticipated ramp-down condition.

* * * * *